May 6, 1941.  R. CHILTON  2,241,055
ARTICULATED PROPELLER
Filed Nov. 3, 1937  4 Sheets-Sheet 1
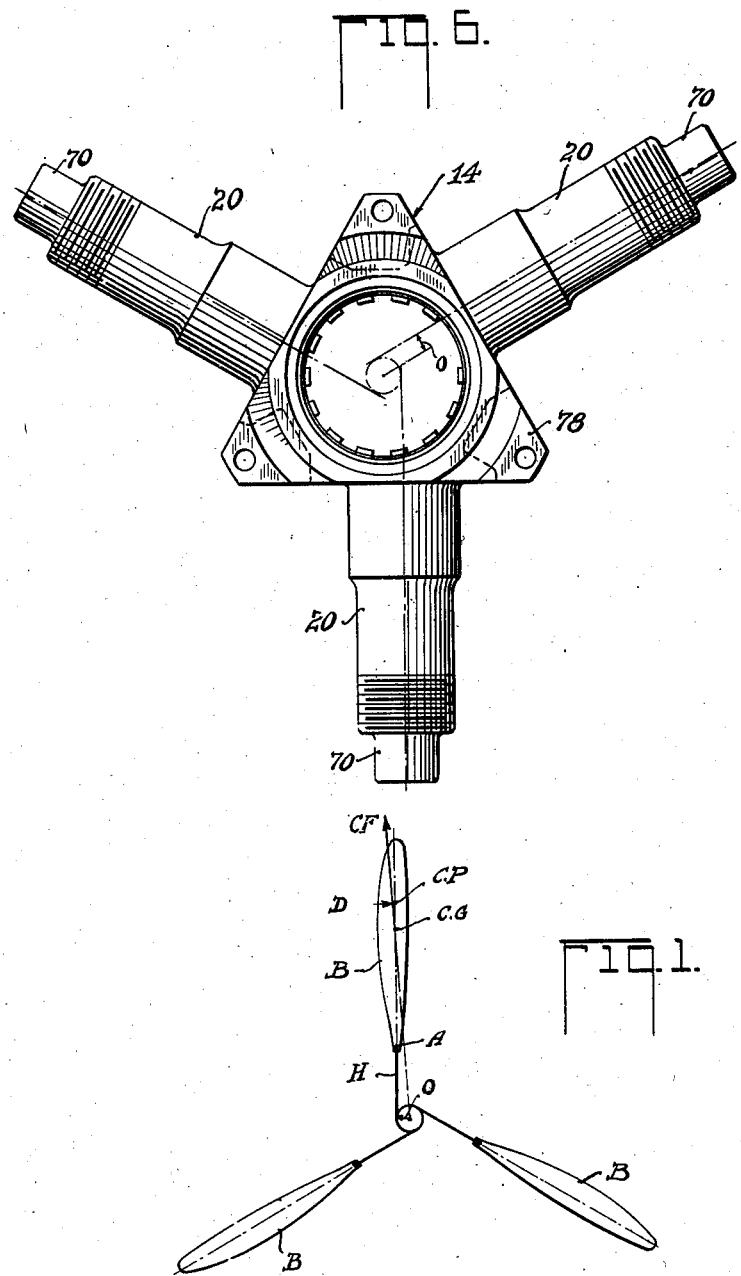
INVENTOR
ROLAND CHILTON
BY
ATTORNEY

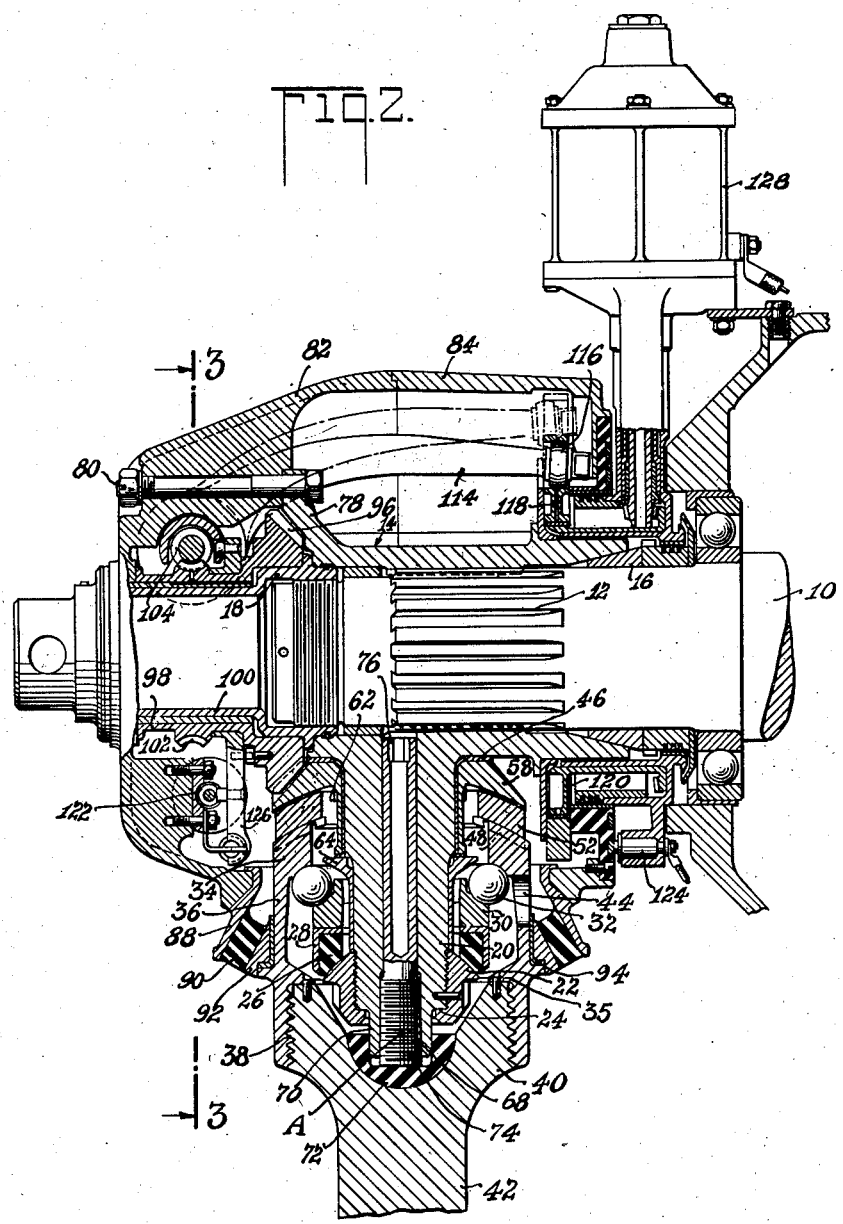

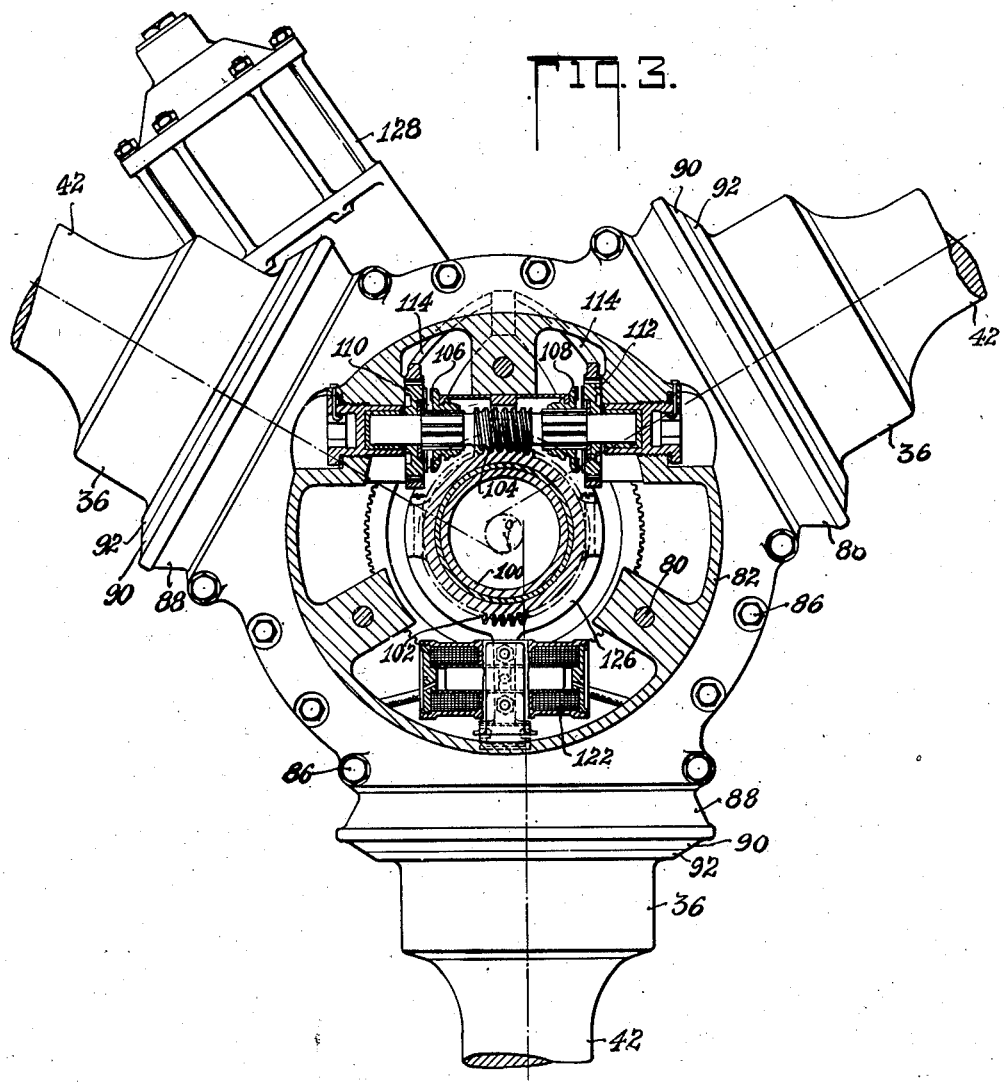

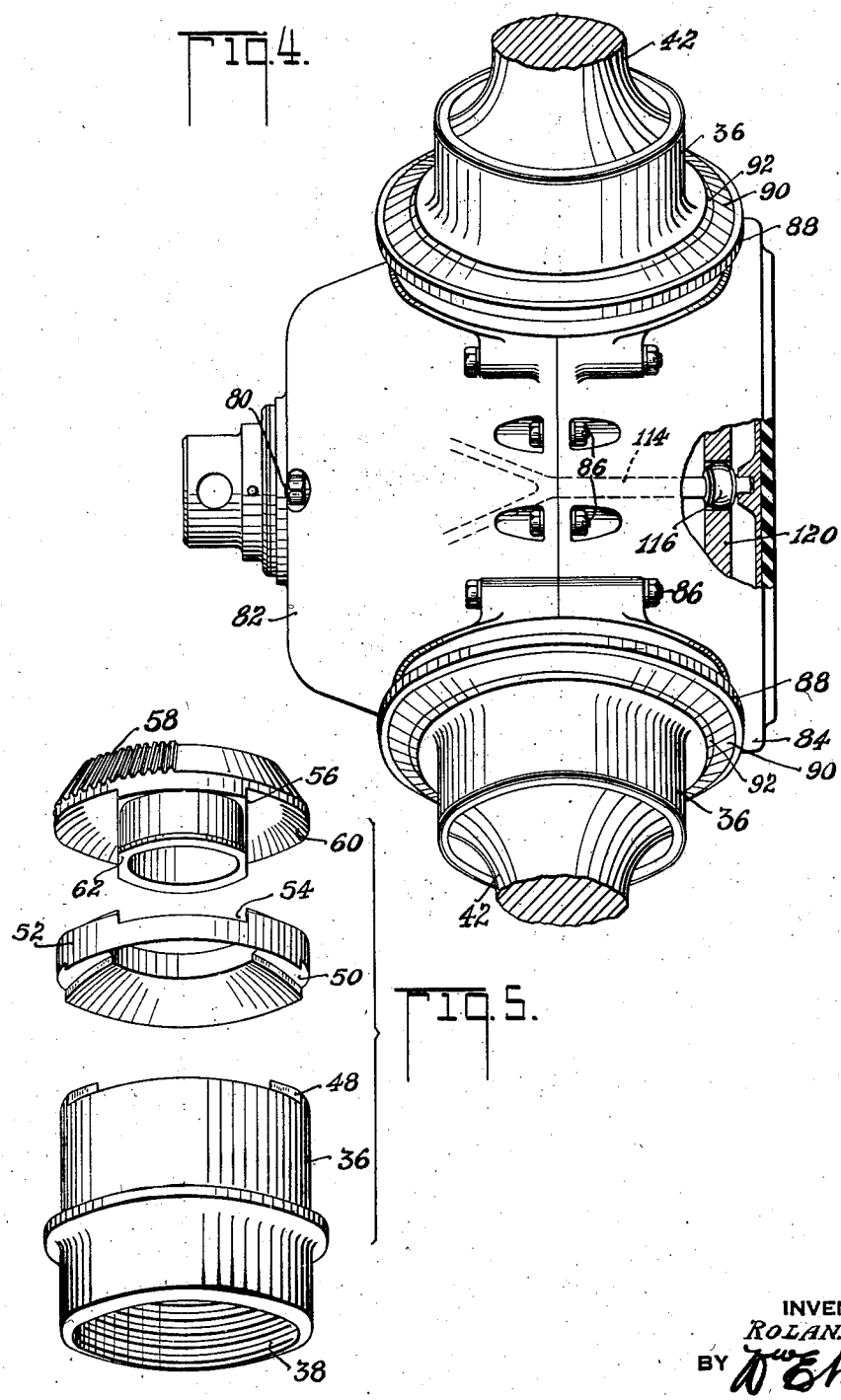

UNITED STATES PATENT OFFICE 2,241,055

ARTICULATED PROPELLER

Roland Chilton, Ridgewood, N. J., assignor to Wright Aeronautical Corporation, a corporation of New York Application November 3, 1937, Serial No. 172,559

13 Claims. (Cl. 170—163)

This invention relates to propellers and particularly to controllable pitch propellers for aeronautical use.

A prime object of the invention is to provide an articulated propeller blade mounting mechanism whereby the major flywheel effect of the propeller mass is removed from the engine crankshaft system to the suppression of torsional vibrations in the shaft and the accompanying bending vibrations in the propeller blades. A directly associated object is to permit of a drastic reduction in the sections and weight of the propeller blades and their mountings. A further object is to provide a variable pitch mounting incorporating blade articulation.

In aeronautical engines the propeller mass comprises a flywheel of very great moment of inertia connected, by the torsionally elastic crankshaft, to the crankpin masses thereon (which include the connecting rods, counterweights, etc.). The propeller blades themselves are subject to bending deflections in operation and the system, accordingly, has certain natural frequencies of vibration depending upon the gross elasticity afforded by the bending yield of the blades and the torsional yielding of the shaft. Should the impulses to which the shaft is subject in operation be synchronous with a natural frequency of the system, destructive vibrations, usually referred to as torsional vibration, are set up. It is important to notice that the system between the blade mass and the crank masses includes the blades themselves, the propeller hub and the attachments therebetween, the flexibility in these elements being added to the torsional yield of the crankshaft insofar as torsional vibrations are concerned.

Accordingly, torsional vibrations are equally destructive on the crankshaft and on the propeller blades, on the propeller hub and on the attachments between these parts, and in practice scuffing and pounding loose of these attachments has been a very common source of trouble whereby the current size and weights of all the parts has become many times greater than any proportions that could be justified on the basis of the mere static torque transmitted or of steady centrifugal force of the blades. In fact, it may be said without exaggeration that the enormous increase in the weights of metal propellers since the first experimental models is almost entirely due to the efforts to eliminate, or to resist, the destructive effects of resonant vibrations.

In general, it may be said that when resonant vibrations are encountered, three courses of correction are open:

1. Incorporating vibration dampening means in the system.
2. Stiffening or strengthening the parts to bring the natural frequency above the range of the operating exciting impulses.
3. Increasing the elasticity or yield of the parts to bring the natural frequency below the range of operating impulses.

Stiffening, per (2) above, has been the development history in the case of aircraft propeller and crankshaft systems as may be seen by a glance at current articles. The present invention carries the third method to the extreme of introducing an actual articulation at what is at present the heaviest blade section i. e., the root.

I am aware that articulated airfoils are in use in rotating wings for aircraft and that the art shows hinged or flexible blades for fans, but as far as I am aware, no practical structure has been developed for successfully articulating the blades of large aircraft engine propellers and certainly none that can be used in a pitch changing propeller blade mounting.

Aside from the bending of the blades as cantilevers upon their hub attachments in the plane of rotation, which is allied with torsional vibrations of the crankshaft-propeller system as a whole, the blades may develop resonant vibrations fore and aft, in response to variations in aerodynamic thrust, as from slipstream interferences or in response to bending deflections in the crankshaft. In all of these vibrations, the principal bending moments in the propeller occur at the root of the blade and, accordingly, are imposed on the blade attachments. In controllable pitch propellers, these usually include anti-friction bearings where the destructive effects of vibration have been particularly difficult to overcome.

The present invention aims at entirely eliminating vibration stresses at the blade roots by an articulated blade attachment whereby each blade is free to assume that attitude wherein centrifugal force on the blade balances the thrust and torque loads which it has to transmit.

Referring first to the torque transmitted by the propeller, the gross bending moment at the roots of conventional rigid radial blades must (neglecting vibration) be equal to the power torque on the propeller shaft. In the present invention, on the contrary, this bending moment is eliminated by articulation permitting the blade axes to lag behind the radial position toward which they are urged by centrifugal force. Taking a typical example of a 1000 H. P. geared engine, it is found that when this angle is of the order of 4°, the resulting tangential centrifugal pull of the blades will balance the torque transmitted (the aerodynamic "drag" of the blade) to the elimination of all bending moments on the blade roots.

It is important here to note that the torque transmitted by any fixed pitch propeller is proportional to the square of the rotational speed and that the centrifugal force varies also with the square of the speed, so that the angle or tangency dimension at which the blade axis stabilizes is the same at all power outputs as long as the engine operates on a specific "propeller load curve." This constant relationship is true for only one pitch setting, and in the case of a controllable pitch propeller, there will be changes in attitude of the blade on its articulation as the pitch is changed. In the present invention, the blades are stabilized by large rubber bushings which will, accordingly, be deflected in resisting these changes from the blade attitude for the average pitch condition for which the propeller is designed.

Similarly, with regard to the thrust forces on the blade, it is found that with current proportions, if the blade is freely hinged at the root, it will only have to lean forward an amount of the order of 1° from the flat plane of rotation, to have the centrifugal force balance the thrust. Such forward canting of the blades is a common practice in conventional rigid propellers to eliminate the thrust bending moment from the blade roots and their hub attachments. However, due to the great preponderance of vibratory effects with rigidly mounted blades, it is doubted if this expedient produces much beneficial reduction in the actual operating stresses.

In the present invention, on the contrary, the blade is articulated both in the torque and thrust directions, and accordingly, bending stresses at the blade roots and their propeller hub attachments are completely eliminated and vibratory resonance of the blades considered as cantilevers is rendered impossible. There are secondary modes of vibrations having nodes along the length of the blades which may produce resonance and these have given some trouble with blade failures towards the tips but in the present invention the blade is substantially insulated from the exciting forces producing such vibration by means of their articulated mounting.

Other objects and advantages will be obvious from or will be pointed out in the following description with reference to the drawings in which, Fig. 1 is a diagram illustrating the principal forces involved;

Fig. 2 is a longitudinal section through the hub and blade root of the invention;

Fig. 3 is a section on the line 3—3 of Fig. 2;

Fig. 4 is a plan view including a fragmentary section;

Fig. 5 is an "exploded" perspective view illustrating a universal coupling, and

Fig. 6 is a detail end view of the propeller hub.

Referring first to the diagram of Fig. 1, the letters B designate propeller blades articulated at A to arms H rigid with a propeller hub. The center of gravity of the blade is indicated at C. G. through which acts the radial centrifugal forces C. F. while the aerodynamic torque or drag D acts on the center of pressure C. P. of the blade area. It will be understood the centrifugal force C. F. is very greatly in excess of the aerodynamic drag or torque D and that these forces will automatically stabilize the blade at some specific offset or tangency dimension O, which will vary in a variable pitch propeller as explained above. Preferably the arm H is disposed at the offset O corresponding to the average cruising pitch position of the propeller. The principal factors involved in determining the appropriate tangency or offset O are the radius to the pivot A, centrifugal force of the blade and the torque to be transmitted, which last as explained above, both vary as the square of the rotational speed, for any given pitch setting whereat the dimension O is independent of the power output and rotational speed.

The preferred construction of an articulated propeller blade mounting will now be described, first with reference to Fig. 2, in which 10 designates a conventional engine propeller shaft having the usual splines 12, on which is mounted a propeller hub, indicated in general at 14, by means of the usual cones 16 and propeller hub nut 18. The hub is provided with integral stubs 20, these being set tangent by the dimension O appropriate to the mean centrifugal force and torque relationships of the propeller blades to be used as indicated in Fig. 6. The stubs 20 are provided with spherical faced nuts 22, screwed tight against a shoulder 24, and abutting a spherical seated washer 26, preferably of non-metallic material, in which case a reinforcing band 28 will be included. The band 28 in turn abuts an outer ball thrust race 30 engaging balls 32 which in turn engage a thrust race element 34, preferably formed integral with a sleeve 36, having screw threads 38 at its outer end into which an enlarged butt 40 of a propeller blade 42 is screwed and shrunk against a shoulder 35 to comprise a permanent attachment of these parts.

It will be noted that the outer diameter of the race 30 is adapted to pass through the bore of the race 34, so that the blade may be disassembled without disturbing the permanent screw thread attachment 38 or the retaining nut 22, by removing the balls one by one through a hole 44 provided for the purpose in the sleeve 36, which may be displaced inwardly upon the removal of a split counter-thrust washer 46, later to be described. The inner end of the sleeve 36 is formed spherically and is provided with "Oldham" coupling projections or driving dogs 48 (shown dotted but better seen in the perspective view of Fig. 5). These driving dogs are fitted to the sides of corresponding radial grooves 50, formed in a sphericalized intermediate ring 52, which has transverse radial grooves 54 formed in its inner spherical face to engage suitable flats 56 formed on a control bevel gear 58 having a spherical surface 60 to which the inner spherical face of the ring 52 is fitted.

Extending from the flatted section 56 of the gear 58 is a bearing hub 62, journalled on the stub 20 and abutting a suitable distance piece 64 which engages the retaining nut 22 as shown. Interposed before the gear 58 and a suitable thrust face formed on the hub 14 is the split flat spacer washer 46 by means of which the bearing and coupling assembly just described is held to zero end play. This split washer 46 is removable to permit sufficient inward movement of the blade 42 and race 24 to permit assembly and disassembly of the balls 32 as previously described. The spherical radii of the retaining nut 22 and of the universal joint elements 48—52—60 are all formed about a common center A which comprises the center of articulation i. e., the hinge center about which the blade is, accordingly, free to pivot universally, that is to say, in the direction of rotation, in the direction of thrust and intermediately.

The stubs 20 are provided with internal threads 68 and with a cylindrical extension 70, about which is fitted a hemispherical abutment plug 72 of Bakelite or analogous material which is also engaged by the head of an adjusting rod 74 engaging the threads 68. The rod is provided at its inner end with a hexagonal end opening 76 for engagement by an adjusting wrench (when the hub is removed from the shaft 10). The spherical radius of the counter-thrust plug 72 is also formed about the common center of articulation A and by means of the adjusting rod 74 the propeller blade assembly may be adjusted outwardly to put some initial load upon the blade ball bearing 30—32—34 to keep the blade assembly at zero back lash. The split washer 46 may be assembled after the ball bearing has been loaded by the rod 74.

The hub member 14 is provided with an integral triangular flange 78 to which is attached, by bolts 80, a front housing 82 to which, in turn, there is attached the rear housing 84 by bolts 86 (Fig. 3). The split housing 82—84 is provided with suitable openings around the propeller blades and clamped therein is an outer member 88 embracing and vulcanized to a large rubber bushing 90, the latter having an inner member 92 also vulcanized thereto which engages the propeller blade sleeve 36 through a shouldered bushing 94 as shown to allow relative rotation. It will be seen that the rubber bushing 90 has its outer element rigid with the housing 82—84 and its inner member constrained for articulation as a unit with the blade 42 and therefore tends to stabilize the blade in its normal average attitude, with its axis aligned with that of the associated stub 20. The rubber bushing offers elastic resistance to any displacement of the blade from its normal position wherein the blade is thus yieldingly stabilized when the propeller is at rest. When the propeller is operating it is stabilized by centrifugal force as previously explained.

The mechanism so far described comprises the preferred form of articulating blade mounting for the purposes set forth and further includes a variable pitch blade mounting, providing a practical solution for the complicated problem of developing a variable pitch articulated blade mount. It is to be understood, however, that the articulated system of this invention may be used with fixed pitch propellers and therefore the pitch changing operating mechanism, also shown, needs only very brief description as it is not, per se, a part of the present invention being similar to that disclosed in my co-pending application Serial No. 189,775, filed February 10, 1938.

In brief, a master control gear 96 concentric with the propeller shaft is meshed with the blade control gears 58 and has a sleeve 98 mounted on a cylindrical extension 100 of the propeller hub nut 18. The sleeve is provided with a worm gear 102 engaged by a transverse worm 104 on which are splined right and left hand ratchets 106—108 (Fig. 3) engageable with companion ratchets 110—112 formed in the hubs of levers 114 having a common ball end 116 engaged with an eccentric strap 118 rotatable with the propeller hub around a normally fixed eccentric 120.

The ratchets 106—108 have a neutral position where both are disengaged from the lever ratchets 110—112, as shown, and a suitable control mechanism, including a solenoid 122 energized through a slip ring and brush assembly 124 is provided whereby either the right or the left hand ratchets may be engaged by means of a yoke 126. An electric motor 128 is secured to the engine housing to rotate the normally fixed eccentric 120 for "feathering," as per my copending application.

In a four stroke explosion engine having "N" cylinders, the principal disturbing force occurs at $$\frac{N}{2}$$

(i. e., the 7th order in the case of a 14-cylinder engine). Conventional master and link rods also introduce first and second order torque variations and any explosion irregularity sets up ½ order forces. The resultant harmonics include all intermediate orders by increments of ½. When resonance in the operating range develops with only one or two orders, the difficulty has been successfully overcome by the use of "dynamic dampers" of appropriate frequencies as discussed in my Patent No. 2,112,984, issued April 5, 1938. When resonance to several orders of harmonics is encountered (2, 2½, 3 and 3½ have been observed in two-bank radial engines) the installation of the necessary plurality of dampers of different frequency becomes cumbersome.

Mathematical analysis of an initial propeller design, based on the proportions shown herein, indicate that synchronism with all orders above the first has been removed from the operating range but that a single first order damper may be required in cases where the amplitude of vibration in response to this order is found to be objectionable.

Due to the possibility of natural vibration periods of a propeller-crankshaft system being synchronous with exciting impulses in the engine, it is now necessary to test propellers and engines together, approval of the combination being the present practice rather than approval of a propeller or engine individually, since apparently small changes in the propeller, or small changes or differences in the shaft system on engines of otherwise similar characteristics, may bring into prominence destructive vibration resonance of an order which was not anticipated as troublesome. Realization of the objectives of this invention would render the crankshaft-propeller system insensitive to small changes or differences in the flexibility of the components of the system.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In combination, a propeller hub having a radially extended stub, a bevel gear journalled on said stub; an anti-friction thrust bearing including a spherical seat establishing a center of articulation for said bearing spaced radially from said hub; a blade shank rigidly secured to a member of said bearing and universal joint means having its center of universal drive movement concentric with said articulation center drivably connecting said bevel gear and said blade, and a companion bevel gear drivably engaging said first mentioned bevel gear for pitch changing rotation thereof.

2. In a controllable pitch propeller, a hub member having substantially radial stubs, propeller blades articulated on said stubs for swinging and for pitch change, a housing rigid with and embracing said hub member having apertures through which said blades project, and annular resilient means embracing each blade and fitted to the housing for sealing the latter while allowing blade articulation and pitch change.

3. In a controllable pitch propeller, a hub member having substantially radial stubs, propeller blades articulated on said stubs for swinging and for pitch change, a housing rigid with and embracing said hub member having apertures through which said blades project, annular resilient means embracing each blade and fitted to the housing for sealing the latter while allowing blade articulation and pitch change, and mechanism contained within said housing for adjusting the pitch of said blades.

4. In a controllable pitch propeller, a hub member having a stub projecting radially therefrom, a bevel gear journaled on the stub, a drive gear meshed with the bevel gear, a propeller blade articulated to said stub for rotation about the stub axis and for tilting, a universal driving connection between said bevel gear and blade, a housing embracing and rigid with the hub having an aperture through which the blade freely passes, and a rubber annulus in said aperture sealing said blade relative to said housing, and providing a resilient cushion resisting extreme tilting of said blade relative to the hub.

5. In a controllable pitch propeller, a hub having a stub projecting substantially radially therefrom, a blade having a sleeve portion embracing the stub, a spherical thrust joint between said sleeve and stub providing a blade articulation, a drive element journaled on said stub, and a spherical Oldham coupling between said drive element and blade sleeve, said coupling being concentric with the articulating spherical joint.

6. In a controllable pitch propeller including a hub, a substantially radially projecting arm extending from said hub, a propeller blade universally joined to said stub about a center close to the outer end of said stub, a sleeve on the blade embracing said stub and extending inwardly of the joint center, the inner end of said sleeve being spherically formed about the joint center, a drive member journaled on and rotatable about the stub, and a universally movable pitch changing driving connection between said member and the spherical inner end of said sleeve.

7. In a controllable pitch propeller including a hub, a substantially radially projecting arm extending from said hub, a propeller blade universally joined to said stub about a center close to the outer end of said stub, a sleeve on the blade embracing said stub and extending inwardly of the joint center, the inner end of said sleeve being spherically formed about the joint center, a drive member journaled on and rotatable about the stub, a universally movable pitch changing driving connection between said member and the spherical inner end of said sleeve, a housing embracing the propeller hub having an aperture through which the propeller blade projects, and a resilient annular cushion in fitting engagement with the housing and blade at its outer and inner surfaces, respectively.

8. In a propeller in combination, a propeller hub having stubs projecting therefrom, pitch changing sleeves journalled on said stubs, means drivably engaging said sleeves for driving same in unison, a propeller blade articulately and rotatably mounted on each stub including facing spherical abutments on the blade and stub for said articulation and an anti-friction bearing for said rotation, between the stub and blade and assuming centrifugal loading, and an articulated driving connection from each pitch changing sleeve to its corresponding blade having its center of articulation coincident with the center of said spherical abutments.

9. In a propeller in combination, a propeller hub having stubs projecting therefrom, pitch changing sleeves journalled on said stubs, means drivably engaging said sleeves for driving same in unison, a propeller blade articulately and rotatably mounted on each stub including facing spherical abutments on the blade and stub for said articulation and an anti-friction bearing for said rotation, between the stub and blade and assuming centrifugal loading, and an articulated driving connection from each pitch changing sleeve to its corresponding blade, said connection comprising a spherical Oldham coupling having its spherical center coincident with the center of blade articulation.

10. In a propeller in combination, a propeller hub having stubs projecting therefrom, pitch changing sleeves journalled on said stubs, means drivably engaging said sleeves for driving same in unison, a propeller blade articulately and rotatably mounted on each stub including facing spherical abutments on the blade and stub for said articulation and an anti-friction bearing for said rotation, between the stub and blade and assuming centrifugal loading, an articulated driving connection from each pitch changing sleeve to its corresponding blade having its center of articulation coincident with the center of said spherical abutments, a hub housing embracing said stubs and articulations having clearance openings around the blades through which the latter project, and resilient diaphragms secured to the blades and the edges of said openings for sealing said housing.

11. An articulating mounting for the blade of a controllable pitch propeller including a hub, comprising a stub on the hub, respectively inwardly and outwardly facing concentric spherical abutments on the stub outer end, means for adjusting one said abutment axially of the stub, a race member engaging the inwardly facing abutment, a blade butt having a socket engaging the outwardly facing abutment and having a sleeve having clearance relation to said race member to assemble thereover and comprising at its inner end a race opposite to the race of said race member, said sleeve having an aperture, and bearing balls, adapted to be inserted through said aperture and between said races after which said abutments are axially spread to tighten the assembly, whereby the blade is free for articulation on the stub and for rotation thereon.

12. An articulating mounting for the blade of a controllable pitch propeller including a hub, comprising a stub on the hub, respectively inwardly and outwardly facing concentric spherical abutments on the stub outer end, means for adjusting one said abutment axially of the stub, a race member engaging the inwardly facing abutment, a blade butt having a socket engaging the outwardly facing abutment and having a sleeve having clearance relation to said race member to assemble thereover and comprising at its inner end a race opposite to the race of said race member, said sleeve having an aperture, bearing balls, adapted to be inserted through said aperture and between said races after which said abutments are axially spread to tighten the assembly, whereby the blade is free for articulation on the stub and for rotation thereon, means for rotating the blade comprising a sphericalized Oldham coupling engaging the blade sleeve and concentric with said abutments and means journalled on the stub for driving said coupling.

13. An articulating mounting for the blade of a controllable pitch propeller including a hub, comprising a stub on the hub, respectively inwardly and outwardly facing concentric spherical abutments on the stub outer end, means for adjusting one said abutment axially of the stub, a race member engaging the inwardly facing abutment, a blade butt having a socket engaging the outwardly facing abutment and having a sleeve having clearance relation to said race member to assemble thereover and comprising at its inner end a race opposite to the race of said race member, said sleeve having an aperture, bearing balls, adapted to be inserted through said aperture and between said races after which said abutments are axially spread to tighten the assembly, whereby the blade is free for articulation on the stub and for rotation thereon, a housing embracing and secured to the hub through which said blades project, and resilient means sealing the blade to the housing.

ROLAND CHILTON.